United States Patent
Jeon

(10) Patent No.: US 10,652,709 B2
(45) Date of Patent: May 12, 2020

(54) METHOD AND APPARATUS FOR AUTOMATIC BLUETOOTH CONNECTION USING BLUETOOTH DUAL MODE

(71) Applicants: HYUNDAI MOTOR COMPANY, Seoul (KR); KIA MOTORS CORPORATION, Seoul (KR)

(72) Inventor: Young Tak Jeon, Asan-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/005,035

(22) Filed: Jun. 11, 2018

(65) Prior Publication Data

US 2018/0295483 A1  Oct. 11, 2018

Related U.S. Application Data

(63) Continuation of application No. 14/939,799, filed on Nov. 12, 2015, now Pat. No. 10,021,511.

(30) Foreign Application Priority Data

Aug. 20, 2015 (KR) .................. 10-2015-0117046

(51) Int. Cl.
*H04W 4/40* (2018.01)
*H04W 4/80* (2018.01)

(52) U.S. Cl.
CPC ............ *H04W 4/40* (2018.02); *H04W 4/80* (2018.02)

(58) Field of Classification Search
CPC ................... H04W 4/40; H04W 4/80
(Continued)

(56) References Cited

U.S. PATENT DOCUMENTS

| 6,982,962 B1* | 1/2006 | Lunsford | H04W 48/18 |
| | | | 370/278 |
| 8,509,768 B2* | 8/2013 | Zhao | H04W 52/0254 |
| | | | 455/434 |

(Continued)

FOREIGN PATENT DOCUMENTS

| CN | 104540091 A | 4/2015 |
| JP | 2014-093686 A | 5/2014 |

(Continued)

OTHER PUBLICATIONS

U.S. Notice of Allowance dated Mar. 15, 2018 issued in U.S. Appl. No. 14/939,799.

(Continued)

*Primary Examiner* — Edward F Urban
*Assistant Examiner* — Rui M Hu
(74) *Attorney, Agent, or Firm* — Morgan, Lewis & Bockius LLP

(57) ABSTRACT

A method for automatic Bluetooth connection in a head unit of vehicle includes discovering an advertisement from a mobile device, based on a period of advertisement discovery, when at least one advertisement corresponding to the mobile device is discovered, changing the period of advertisement discovery, discovering the advertisement based on a changed period of advertisement discovery, and arranging a Bluetooth connection between a head unit and a mobile device corresponding to the discovered advertisement.

12 Claims, 9 Drawing Sheets

(58) Field of Classification Search
USPC .................. 455/41.1–41.3, 569.2, 574, 434, 455/161.1–161.3, 343.5
See application file for complete search history.

(56) References Cited

U.S. PATENT DOCUMENTS

| | | | | |
|---|---|---|---|---|
| 8,737,917 | B2* | 5/2014 | Desai | H04W 8/005 455/41.2 |
| 8,954,007 | B2 | 2/2015 | Hillyard | |
| 9,008,917 | B2* | 4/2015 | Gautama | B60W 10/30 455/41.2 |
| 9,100,892 | B2* | 8/2015 | Borges | H04W 4/70 |
| 9,258,694 | B2* | 2/2016 | Palin | H04W 8/005 |
| 9,414,426 | B2* | 8/2016 | Park | H04W 4/80 |
| 9,820,135 | B2* | 11/2017 | Wang | H04W 4/80 |
| 10,034,124 | B2* | 7/2018 | Son | H04W 12/06 |
| 2003/0008675 | A1* | 1/2003 | Willats | B60R 25/24 455/515 |
| 2007/0047506 | A1* | 3/2007 | Froehling | H04W 52/0216 370/338 |
| 2007/0202807 | A1* | 8/2007 | Kim | H04B 5/0062 455/41.2 |
| 2008/0287062 | A1* | 11/2008 | Claus | H04W 12/02 455/41.2 |
| 2009/0061770 | A1* | 3/2009 | Agardh | H04W 52/0225 455/41.2 |
| 2009/0098916 | A1* | 4/2009 | Abdel-Kader | H04W 48/16 455/574 |
| 2011/0021142 | A1* | 1/2011 | Desai | H04W 8/005 455/41.2 |
| 2011/0117845 | A1* | 5/2011 | Kirsch | H04M 1/6091 455/41.2 |
| 2012/0256726 | A1* | 10/2012 | Honkanen | H04W 64/006 340/10.1 |
| 2013/0040573 | A1* | 2/2013 | Hillyard | H04W 8/005 455/41.2 |
| 2013/0217384 | A1* | 8/2013 | Snider | H04W 24/10 455/434 |
| 2013/0225197 | A1* | 8/2013 | McGregor | G01S 1/68 455/456.1 |
| 2014/0094123 | A1* | 4/2014 | Polo | H04W 52/0216 455/41.2 |
| 2014/0179234 | A1* | 6/2014 | Lee | H04W 8/005 455/41.2 |
| 2014/0194063 | A1* | 7/2014 | Bahadirov | H04W 8/005 455/41.2 |
| 2014/0206286 | A1* | 7/2014 | Palin | H04W 8/005 455/41.2 |
| 2014/0370811 | A1* | 12/2014 | Kang | H04W 84/18 455/41.2 |
| 2015/0161834 | A1* | 6/2015 | Spahl | H04W 4/80 340/5.61 |
| 2015/0163748 | A1* | 6/2015 | Hrabak | H04W 52/0245 455/41.2 |
| 2015/0172906 | A1* | 6/2015 | Terazaki | H04W 76/10 455/434 |
| 2015/0296329 | A1* | 10/2015 | Mao | H04W 8/005 370/338 |
| 2015/0365780 | A1* | 12/2015 | Xie | H04M 1/7253 455/41.2 |
| 2015/0365999 | A1* | 12/2015 | Lee | H04W 4/80 381/315 |
| 2015/0373761 | A1* | 12/2015 | Okamoto | H04W 12/06 455/41.2 |
| 2016/0037566 | A1* | 2/2016 | Jakusovszky | H04W 8/005 455/41.2 |
| 2016/0037573 | A1* | 2/2016 | Ko | G06K 9/00597 455/41.2 |
| 2016/0094939 | A1* | 3/2016 | Guy | H04W 52/0254 455/456.2 |
| 2016/0099936 | A1* | 4/2016 | Enke | H04L 63/0428 726/7 |
| 2016/0119962 | A1* | 4/2016 | Kim | H04W 76/14 455/41.2 |
| 2016/0174266 | A1* | 6/2016 | Goel | H04W 4/70 455/509 |
| 2016/0183077 | A1* | 6/2016 | Wang | H04W 4/80 455/41.2 |
| 2016/0191704 | A1* | 6/2016 | Macinnes | H04W 4/90 |
| 2016/0373893 | A1* | 12/2016 | Khanna | H04W 4/021 |
| 2017/0086098 | A1* | 3/2017 | Kwon | H04W 28/22 |
| 2019/0159698 | A1* | 5/2019 | Petrucelli | A61B 5/0537 |

FOREIGN PATENT DOCUMENTS

| | | |
|---|---|---|
| KR | 10-2007-0005805 A | 1/2007 |
| KR | 2008-0031244 A | 4/2008 |
| KR | 10-2013-0037017 A | 4/2013 |
| KR | 102013-0038754 A | 4/2013 |
| KR | 10-2015-0065004 A | 6/2015 |

OTHER PUBLICATIONS

U.S. Non-Final Office Action dated Oct. 19, 2017 issued in U.S. Appl. No. 14/939,799.
Korean Office Action issued in corresponding Korean Patent Application No. 10-2015-0117046, dated Aug. 10, 2016 (5 pgs) (with English translation).
Notice of Allowance issued in corresponding Korean Patent Application No. 10-2015-0117046, dated Oct. 11, 2016 (5 pgs).
U.S. Non-Final Office Action dated Jan. 13, 2017 issued in U.S. Appl. No. 14/939,799.
Chinese Office Action dated Mar. 12, 2020 issued in Chinese Patent Application No. 2015108561649 (with English translation).

* cited by examiner

METHOD AND APPARATUS FOR AUTOMATIC BLUETOOTH CONNECTION USING BLUETOOTH DUAL MODE

CROSS-REFERENCE TO RELATED APPLICATION

This application is a continuation patent application of U.S. patent application Ser. No. 14/939,799, which claims the benefit of priority to Korean Patent Application No. 10-2015-0117046, filed on Aug. 20, 2015 with the Korean Intellectual Property Office, the disclosure of which are hereby incorporated by reference herein.

TECHNICAL FIELD

The disclosure relates to a method for automatic Bluetooth connection for use in a vehicle, and more particularly to a device and a method, adapted in a vehicle, for using Bluetooth dual mode to automatically discover a device adjacent to the vehicle and making an arrangement to communicate with the terminal via Bluetooth.

BACKGROUND

Information technology (IT) has a strong influence on the automobile industry, and plural IT techniques or abilities are incorporated into a vehicle.

Recently, a vehicle pairing technology may engage with a communication device such as a smartphone so as to provide various services has become common.

Generally, when a vehicle is started, a head unit having a hands-free function via Bluetooth in the vehicle turns on a Bluetooth function, and operates in a pairing standby state. A driver or operator selects an option on a predetermined menu provided by the head unit and the smartphone to thereby perform a pairing process. After the pairing process is completed, the driver or operator can make a call via the hands-free function.

As Bluetooth technology has become widespread, a skilled user having sufficient experience with the Bluetooth technology can precede the pairing process without a problem. However, a user who is a stranger to a Bluetooth technology feels uncomfortable in the conventional pairing process because it is complicated, so the unaccustomed user may not use Bluetooth technology.

Bluetooth pairing technology can be directed to vehicle safety, and bring more convenience to a driver while the driver operates a vehicle.

When a vehicle including a Bluetooth function is sold, a seller helps a setup for a Bluetooth pairing process to a new driver/operator.

However, when the driver/operator has a new mobile device, he or she should register the new mobile device, or remove registration of the old one, to use the Bluetooth function in the vehicle. In this case, since the driver or operator tries to setup a Bluetooth pairing process which can be considered a complicated job, the driver or operator still may experience inconvenience in the Bluetooth function.

Generally, only if a Bluetooth module or function in a mobile device possessed by a driver/operator (or a passenger) is turned on or active, a Bluetooth pairing process with a head unit in a vehicle initiates.

Further, a radio frequency identification (RFID) or a quick response (QR) code is suggested for an automatic Bluetooth pairing process between a vehicle and driver's mobile device having a Bluetooth function. However, a separate technology such as an RFID or a QR code requires additional circuits or modules in a vehicle, and a driver or operator need to understand how to use, control or adjust the additional features or functions. Accordingly, those additional technologies are not effective regarding user convenience and manufacturing costs.

Additionally, there are limitations to registering a mobile device having a Bluetooth function with a vehicle. Particularly, since a Bluetooth pairing process proceeds based on a priority given to each of the registered mobile devices, it can take a long time for a preferred mobile device to engage with a vehicle if the preferred mobile device has a low priority.

SUMMARY OF THE DISCLOSURE

Embodiments of the disclosure can be directed to a method and an apparatus for automatic Bluetooth connection through a Bluetooth dual mode.

Embodiments of the disclosure can provide a method and an apparatus operable to automatically couple a vehicle to a mobile device including a Bluetooth function via an advertising scan in a Bluetooth dual mode.

Embodiments of the disclosure can suggest a method and an apparatus for automatic Bluetooth connection through a Bluetooth dual mode, which can control a period for discovering an advertisement based on plural vehicle status information, to thereby optimize power consumption of battery in a vehicle.

A method for automatic Bluetooth connection in a head unit of vehicle includes discovering an advertisement from a mobile device, based on a period of advertisement discovery. When at least one advertisement corresponding to the mobile device is discovered, the period of advertisement discovery can be adjusted. The automatic Bluetooth connection can be performed by discovering the advertisement based on a changed period of advertisement discovery. A Bluetooth connection between a head unit and a mobile device can be arranged in response to the discovered advertisement.

The period of advertisement discovery is adjusted to increase a search time and the number of periods during a predetermined time unit.

The period of advertisement discovery is adjusted to increase a search ratio during a predetermined time unit.

The advertisement can be discovered when operating in a background mode if the head unit is not turned on. If the advertisement is discovered in the background mode, the head unit can be turned on to thereby engage with a corresponding mobile device transmitting the advertisement for the Bluetooth connection.

The advertisement is transmitted from the mobile device when a Bluetooth function of the mobile device is inactivated.

When at least one advertisement corresponding to the mobile device is undiscovered after the period of advertisement discovery is changed, the period of advertisement discovery can be changed so as to decrease a search time and the number of periods during a predetermined time unit.

Vehicle status information can be inputted from a vehicle gateway engaged via in-vehicle networking, and then the period of advertisement discovery can be adjusted based on the vehicle status information.

The vehicle status information includes at least one of a vehicle battery charging state and a vehicle ignition state.

When the vehicle status information is an "on" status, adjusting the period of advertisement discovery to maximize at least one of a search time, the number of periods, and a search ratio during a predetermined time unit.

The advertisement discovery can be stopped when the vehicle status information includes a warning of vehicle battery charging state.

The automatic Bluetooth connection is performed by obtaining information relating to a current time slot. The period of advertisement discovery can be adjusted based on the present time slot.

If the present time slot is within a driving time window, the period of advertisement discovery can be changed so as to increase at least one of a search time, the number of periods, and a search ratio during a predetermined time unit. Otherwise, if the present time slot is not within a driving time window, the period of advertisement discovery can be adjusted to decrease at least one of the search time, the number of periods, and the search ratio during the predetermined time unit.

For automatic Bluetooth connection, a predetermined screen configured to receive a value, which sets up the period of advertisement discovery according to user's selection on a menu, can be used. The period of advertisement discovery can be changed in response to the value.

For automatic Bluetooth connection, a request signal for activating a Bluetooth function of the mobile device can be transmitted. The Bluetooth connection is arranged after the Bluetooth function of the mobile device is activated in response to the request signal.

The advertisement is a signal including a periodic pulse.

A method for automatic Bluetooth connection in a mobile device engaging with a head unit of vehicle includes broadcasting an advertisement with a predetermined period of advertisement broadcast when a Bluetooth function is inactivated. The period of advertisement broadcasting can be changed based on current status information of mobile device, and the advertisement can be broadcasted with the changed period for advertisement broadcast. The current status information includes at least one of a battery charging state and a Bluetooth connection state with the head unit of vehicle.

A request signal for activating the Bluetooth function is inputted from the head unit of vehicle. In response to the request signal, whether an automatic Bluetooth connection function is activated is checked. When the automatic Bluetooth connection function is activated, the Bluetooth function is activated so as to arrange a Bluetooth connection with the head unit.

When the automatic Bluetooth connection function is not activated, a predetermined screen, configured to receive user's confirmation which allows that the automatic Bluetooth connection function works, can be shown.

An apparatus for automatic Bluetooth connection can include an advertisement discovery unit configured to detect an advertisement from a mobile device based on a period of advertisement discovery, a discovery period decision unit configured to change the period of advertisement discovery when the advertisement discovery unit discovers at least one advertisement transmitted from the mobile device, and a Bluetooth communication unit configured to arrange a Bluetooth connection with the mobile device corresponding to the discovered advertisement. The advertisement discovery unit discovers the advertisement based on the changed period.

If the advertisement is first discovered, the discovery period decision unit can determine the period of advertisement discovery to thereby increase at least one of a search time, the number of periods, and a search ratio during a predetermined time unit.

When the advertisement is discovered in a background mode if the Bluetooth communication unit is inactivated, the Bluetooth communication unit is activated to thereby engage with a corresponding mobile device transmitting the advertisement for the Bluetooth connection.

When at least one advertisement corresponding to the mobile device is undiscovered after the period of advertisement discovery is changed, the discovery period decision unit adjusts the period of advertisement discovery to decrease at least one of a search time and the number of periods during a predetermined time unit.

The apparatus can further include a vehicle information collecting unit configured to collect vehicle status information from a vehicle gateway engaged via in-vehicle networking. The discovery period decision unit adjusts the period of advertisement discovery based on the vehicle status information.

The vehicle status information includes at least one of a vehicle battery charging state and a vehicle ignition state.

The discovery period decision unit changes the period of advertisement discovery based on a current time slot.

The apparatus further include a display unit configured to show a predetermined screen for receiving a value, which sets up the period of advertisement discovery, according to user's selection on a menu. The discovery period decision unit adjusts the period of advertisement discovery based on the value.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
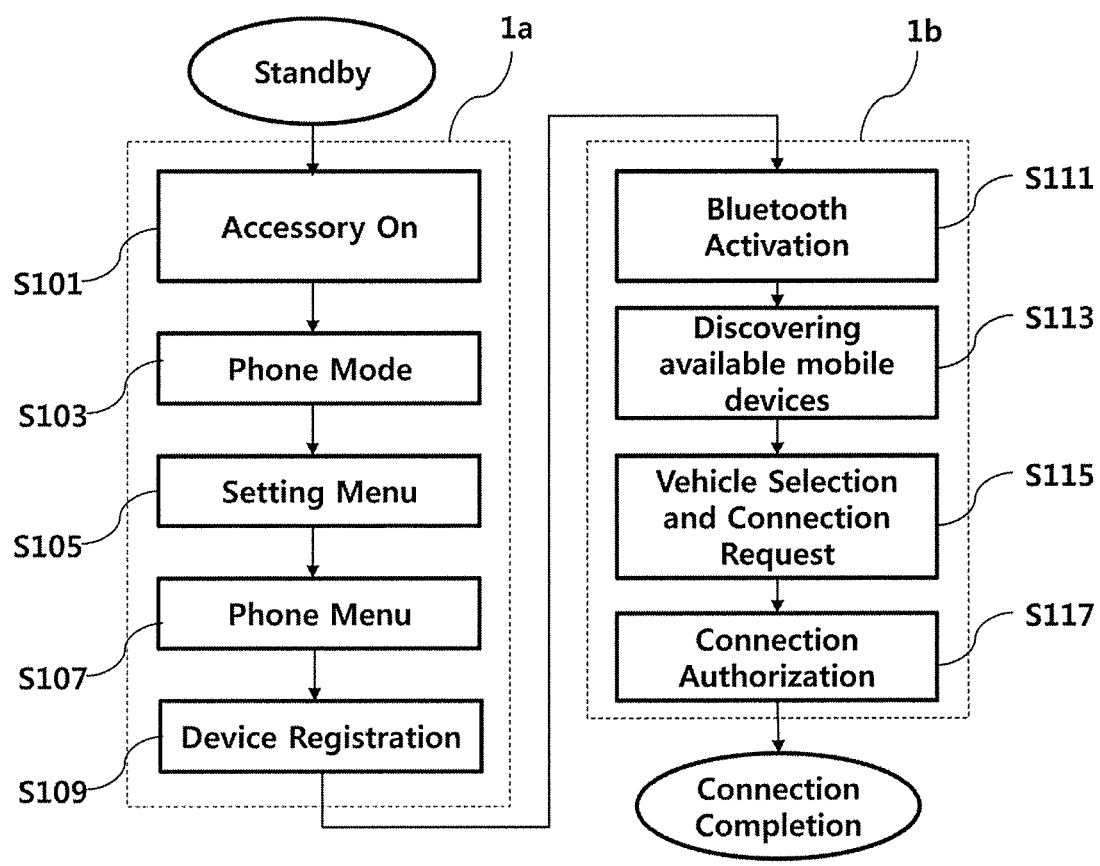
FIG. 1 shows a Bluetooth pairing process in a vehicle.

Reference will now be made in detail to the preferred embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the present disclosure will be more clearly understood from the accompanying drawings and should not be limited by the accompanying drawings. It is to be appreciated that all changes, equivalents, and substitutes that do not depart from the spirit and technical scope of the present disclosure are encompassed in the present disclosure.

FIG. 1 shows a Bluetooth pairing process in a vehicle.

A first part 1*a* includes a Bluetooth pairing process performed by a head unit in the vehicle, and a second part 1*b* includes a Bluetooth pairing process performed in a mobile device.

Referring to 1*a*, when a user (e.g., a driver or an operator) starts the vehicle or the electric systems in the vehicle are powered, i.e., vehicle is started or accessories are turned on, the head unit (H/U) may begin a Bluetooth pairing process. The head unit operates in a phone mode, and tries to perform a pairing with a registered or prearranged user's device, e.g., a driver's smartphone. Further, on a display screen in the head unit of vehicle, a message or interface announcing that the vehicle is engaging with a particular device can be shown.

If a Bluetooth pairing process automatically performed is cancelled by a user or a driver after the vehicle starts (e.g., accessory-on or ignition state), the head unit in the vehicle may sequentially show a setting menu and a phone menu on a predetermined user interface screen (hereinafter, called a device registration selection screen) including a menu to either register a new mobile device or select one of mobile devices registered before (S105 to S109). On the device registration selection screen, a user or a driver can specify a mobile device engaged with the head unit according to a selection on the menu. Further, on a display screen of the head unit, it can show a guide message giving an instruction to activate a Bluetooth function of mobile device which is a candidate for Bluetooth connection.

Referring to the second part 1*b*, in response to the guide message on the display screen of the head unit, the Bluetooth function of a mobile device can be activated (S111).

If the Bluetooth function of mobile device is activated by a user or a driver, the mobile device searches neighboring devices available for a Bluetooth pairing, and shows a search result on a screen (S113).

When the user or driver selects the vehicle on the screen showing the search result, the mobile device transmits a connection request signal to the selected vehicle (S115). At this time, the screen of a mobile device shows a safety key input interface asking a safety key value, corresponding to the vehicle, to the user or driver.

Upon receiving the connection request signal from the mobile device, the head unit of vehicle informs the vehicle information and the safety key value on the display screen.

The mobile device receives a safety key value on the screen and transmits the inputted safety key value to the head unit of the vehicle. The head unit of the vehicle, if the received safety key value is the same with the informed safety key value, transmits to the mobile device an authorization message announcing authorization for Bluetooth connection (S117).

Hereinafter, referring to FIGS. 2 to 9, a method and apparatus for automatic Bluetooth connection using Bluetooth dual mode are described in detail.

Figure 2:
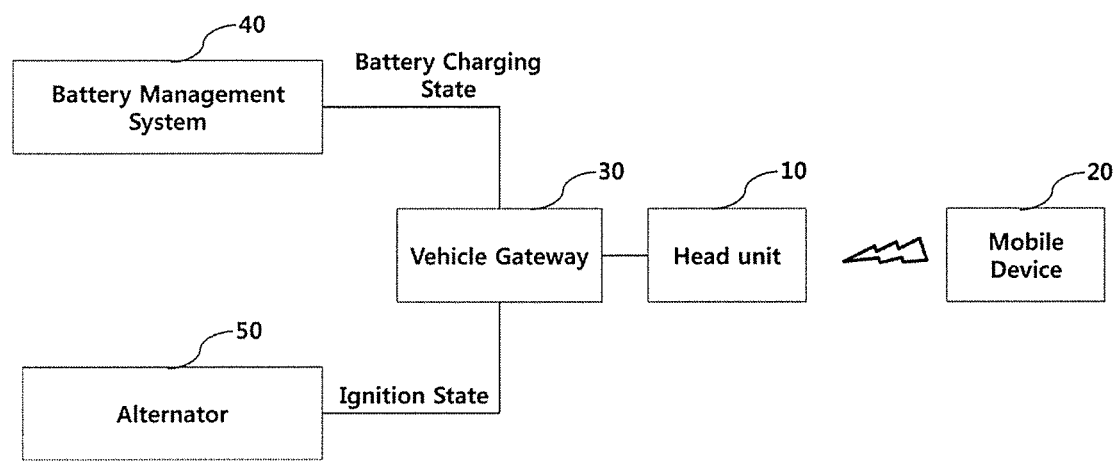
FIG. 2 describes a system for automatic Bluetooth connection, which shows a method for automatic Bluetooth connection using a Bluetooth dual mode.

FIG. 2 describes a system for automatic Bluetooth connection, which shows a method for automatic Bluetooth connection using a Bluetooth dual mode.

As shown, the system for automatic Bluetooth connection can include a head unit 10, a mobile device 20, a vehicle gateway 30, a battery management system (BMS) 40 and an alternator 50.

The head unit 10 is a kind of multimedia system supporting a Bluetooth communication, and transmits and receives plural information via Bluetooth pairing with the mobile device 20. Particularly, the head unit 10 can include a function selectively working in a dual mode or a single mode. In Bluetooth dual mode supported by a standard version 4.1 or later, plural functions such as an adaptive frequency hopping, a low power acknowledgement, a very fast connection, or the like can be provided.

By way of example but not limitation, the mobile device 20 can be a smartphone available to a Bluetooth connection, or any device capable of communicating with the head unit 10 via a Bluetooth pairing process for Bluetooth connection.

The mobile device 20 can broadcast a periodic advertisement for informing its existence to the head unit 10. At this time, the periodic advertisement can be transmitted in a case when an automatic Bluetooth connection function is activated by a user's selection or setting. For example, the mobile device 20 can include an application provided by a vehicle manufacturer, and the application provides a predetermined menu (or option) to determine whether the automatic Bluetooth connection function is activated. While the automatic Bluetooth connection function is activated, the advertisement can be periodically transmitted even if a function for Bluetooth connection is turned off (not activated).

The head unit 10 can discover the advertisement broadcasted with a predetermined period from the mobile device 20. The head unit 10, if the advertisement is discovered, transmits a request signal for activating the function for Bluetooth connection to the mobile device 20. The mobile device 20, responsive to the request signal, automatically turns on the function for Bluetooth connection, and performs a Bluetooth pairing process. Herein, in the mobile device 20, the automatic Bluetooth connection function can be activated.

However, when receiving the request signal while the automatic Bluetooth connection function is not activated, the mobile device 20 can show on a screen an interface for automatic Bluetooth connection, including a guide message to obtain a user's agreement to allow activation of the automatic Bluetooth connection function. The user can activate the automatic Bluetooth connection function by selecting an option on a predetermined menu in the interface on the screen.

The head unit 10 can be capable of discovering an advertisement as a background mode even if the vehicle does not start or other functions of the head unit are not activated, e.g., an audio-video-navigation (AVN) system are turned off.

If the advertisement is discovered, the head unit 10 is automatically booted so as to perform a Bluetooth pairing process for Bluetooth connection automatically. After confirming whether an automatic Bluetooth connection function is activated in a mobile device corresponding to the discovered advertisement, the head unit 10 can begin the Bluetooth pairing process with the mobile device only if the automatic Bluetooth connection function is activated.

Further, the head unit 10 can adaptively change a period of advertisement discovery based on vehicle status information. Herein, the period of advertisement discovery can be adjusted by changing an active time for discovering an advertisement during a time unit, i.e., a search time, or the active period of advertisement discovery during the time unit, i.e., the number of periods. For example, the period can be changed by adjusting a time ratio for advertisement discovery during the time unit, i.e., a search ratio. The period of advertisement discovery is described in detail referring to FIG. 4.

The head unit 10 upon discovering a neighboring Bluetooth device throughout an advertisement discovery can perform a Bluetooth pairing process as a background mode to thereby obtain information of a corresponding mobile device. By way of example but not limitation, the information of a mobile device can include a device identifier uniquely identifying each mobile device, a class of device (COD), a Bluetooth device address, a clock, or the like.

Further, the head unit 10 can determine who owns the corresponding mobile device based on the obtained information. In this case, user information corresponding to the information of a Bluetooth device is previously registered in the head unit 10 throughout either a predetermined user interface provided by the head unit 10, or an application installed in the mobile device to engage with the vehicle. For example, after installing the application downloaded from an application server, the user can register, or manage (change, delete, add, or etc.), a user's or driver's information into the head unit 10 of vehicle via the application.

As described above, the head unit 10 of a vehicle can recognize a driver who could access the vehicle when the driver is within about a few hundred meters or dozens of meters to the vehicle. Further, in response to recognized information, the head unit 10 can automatically perform a Bluetooth pairing process simultaneously when, or directly before or after, the driver gets on the vehicle. Accordingly, the driver does not need wait for use of a Bluetooth connection after getting in the vehicle.

The head unit 10 can engage with the vehicle gateway 30 to collect vehicle status information. For example, the vehicle gateway 30 can transfer a battery charging state transmitted from the battery management system 40 and an ignition state delivered from the alternator 50. Herein, by way of example but not limitation, the battery charging state can include a charge amount of battery, a voltage level of battery, and so on.

If the vehicle does not start, the head unit 10 can determine the period of advertisement discovery based on the battery charging state informed before the vehicle is turned off, or based on periodically collected information of a battery via in-vehicle communication unit. For example, even if the vehicle does not start, the battery charging state can be collected to thereby automatically wake up the vehicle gateway 30 and the battery management system 40.

In addition, the ignition state can include information of predetermined operations performed according to a voltage level supplied to the vehicle. By way of example but not limitation, the ignition state can include a turn-off state, an accessory-on state, an air-conditioning state, an ignition, etc. Various operations of a vehicle can be set up or determined according to a supply voltage level.

For example, when the vehicle starts, the head unit can determine the period of advertisement discovery to maximize the search time because power consumption of a vehicle is not a considerable factor/issue. When the vehicle starts, the head unit 10 can continuously discover an advertisement.

For example, if the battery charging state warns of a situation, e.g., a warning sign of low battery on a cluster is turned on, the head unit 10 of vehicle is controlled not to perform the advertisement discovery until the battery charging state become normal.

For example, when the battery is sufficiently charged beyond a predetermined standard, i.e., the charging amount of battery is enough, the head unit 10 controls the period of advertisement discovery to thereby increase at least one of the search time, the number of periods, and the search ratio during a predetermined time unit.

By way of example but not limitation, a technology such as a controller area network (CAN) or an Ethernet can be used for communication between the head unit 10 and the vehicle gateway 30.

Further, the head unit 10 can change the period of advertisement discovery according to a current time slot. For example, if the current time slot is a day time when the vehicle is frequently driven, the head unit 10 may control the period of advertisement discovery to increase the search time and/or the number of periods during a time unit so that the head unit 10 can detect a mobile device faster. However, if the current time slot is a night time when the vehicle is not frequently driven, the head unit 10 may control the period of advertisement discovery to decrease the search time and/or the number of periods during a predetermined time unit.

In addition, the head unit 10 of vehicle can calculate an accumulated search time until the first mobile device is discovered. If the accumulated search time is beyond a predetermined reference time, the head unit 10 can control the period of advertisement discovery to thereby minimize the search time and/or the number of periods during a predetermined time unit.

Further, the head unit 10 can set up the period of advertisement discovery via a predetermined user interface.

For example, the head unit 10 can adjust the period of advertisement discovery based on at least one of the battery charging state, the ignition state, the current time slot, a user's setting information, and any combination thereof. Herein, different priority can be given to each of the battery charging state, the ignition state, the current time slot, a user's setting information, and the head unit 10 can control the period of advertisement discovery based on the priorities given to each based on information.

As described above, the head unit 10 periodically discovers an advertisement broadcasted by a mobile device. However, the head unit 10 can perform a periodic advertisement discovery. For example, the head unit 10 can continuously discover an advertisement when the vehicle is running, starting or when the battery is fully charged.

Figure 3:
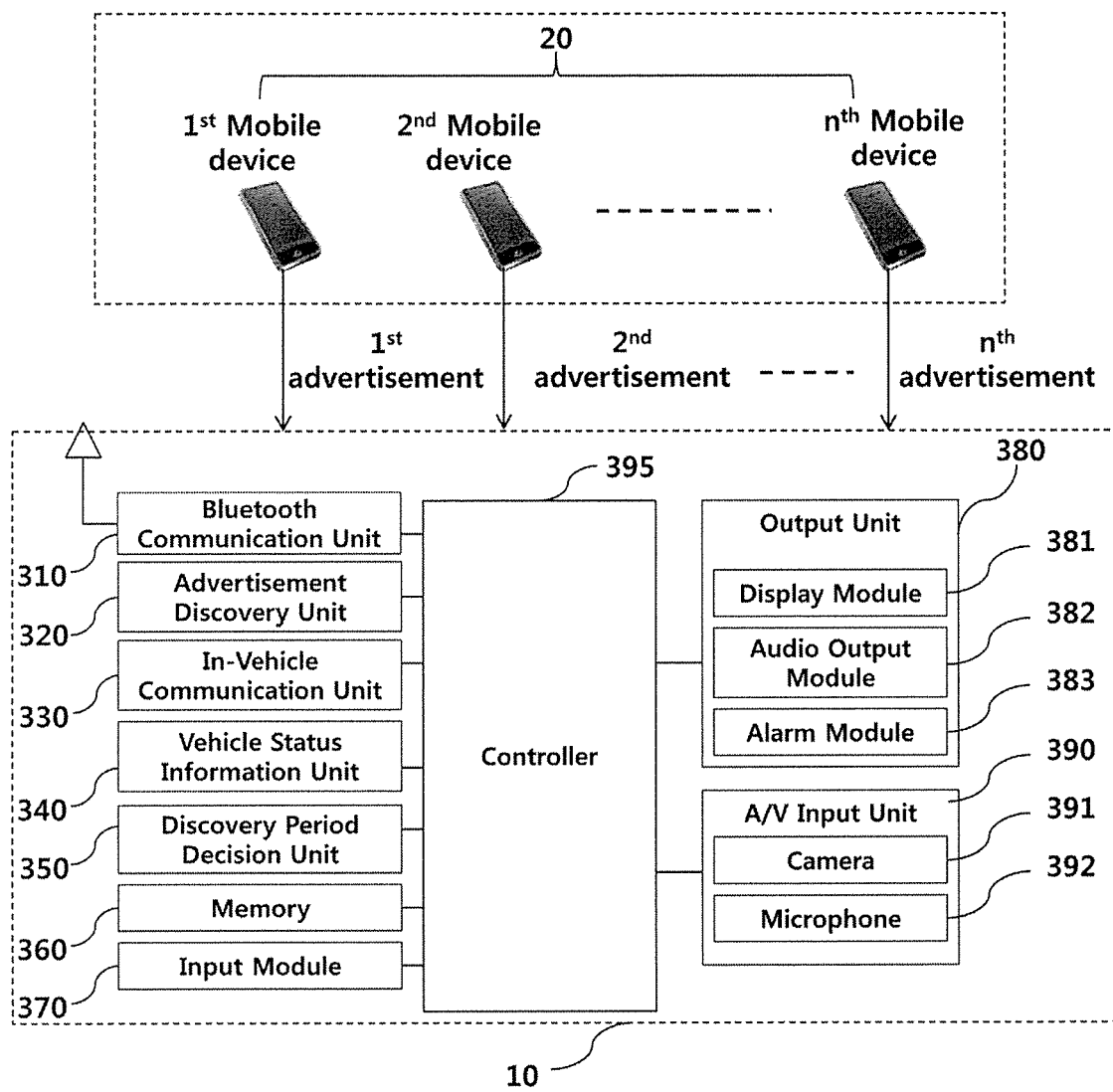
FIG. 3 shows a head unit in a vehicle.

FIG. 3 shows a head unit in a vehicle.

As shown, the head unit 10 can discover an advertisement broadcasted from plural mobile devices 20 based on a predetermined period of advertisement discovery so as to recognize a mobile device available for Bluetooth pairing process.

The head unit 10 can include a Bluetooth communication unit 310, an advertisement discovery unit 320, an in-vehicle communication unit 330, a vehicle status information unit 340, a discovery period decision unit 350, a memory 330, an input module 370, an output unit 380, an audio/video (A/V) input unit 390, and a controller 395. If the above-mentioned elements are not mandatory, some elements can be omitted. Further, other elements can be added.

The Bluetooth communication unit 310 can include a baseband module configured to perform a baseband signal processing under the Bluetooth standard, a power amplifier configured to amplify the baseband signal, a band pass filter configured to modulate the baseband signal into a signal having a carrier of transmission frequency and to pass a signal only having a frequency falling within a predetermined range among transmitted or received signals such as an RF signal, a low noise amplifier configured to amplify the filed RF signal to be easily recognized and deliver the amplified signal into the baseband module, an antenna configured to transmit or receive the RF signal, and the like. The Bluetooth communication unit 310 can perform a Bluetooth pairing process for Bluetooth connection with the mobile device 20.

The advertisement discovery unit 320 can discover an advertisement broadcasted by the mobile device 20 according to a predetermined period of advertisement discovery.

The in-vehicle communication unit 330 can provide communication between the vehicle gateway 30 and other electric control devices adapted in the vehicle. By way of example but not limitation, the in-vehicle communication unit 330 can support a CAN communication technology, or an Ethernet technology.

The vehicle status information unit 340 can collect plural vehicle states which are necessary to determine the period of advertisement discovery. Herein, the collected vehicle states can be stored in the memory 360, or provided real-time to the discovery period decision unit 350.

The discovery period decision unit 350 can determine, or change, the period of advertisement discovery based on the vehicle status information and/or whether an advertisement is discovered, and provide the determined period of advertisement discovery to the advertisement discovery unit 320.

The memory 360 can store a program operable for the controller 395 and other modules controlled by the controller 395, and temporarily store input/output data, e.g., an address, a message, an image, a video, a vehicle status information, a registration information of mobile device, an application program, and the like. Herein, the application program can include programs operable for performing navigation, a game, a chat, a web search, a scheduler, a multimedia play/record, etc.

Particularly, the memory 360 can store an application program providing a predetermined user interface to setup the period of advertisement discovery.

The memory 360 can include at least one type of memory or recoding medium including a flash memory, a hard disk, a solid state disk (SSD), a silicon disk drive (SDD), a multimedia card (MMC), a multimedia micro card, a Secure Digital (SD) card, an xD-Picture Card, a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, and so on.

The input module 370 can generate an input data for controlling operations of head unit 10. For example, the input module 370 can include a key pad, a dome switch, a touch pad (e.g., a touch sensitive member that detects changes in resistance, pressure, capacitance, etc. due to being contacted), a jog wheel, a jog switch, and the like.

The output unit 380 is configured to provide outputs in a visual, audible, and/or tactile manner (e.g., audio signal, video signal, alarm signal, vibration signal, etc.). The output unit 380 may include a display module 381, an audio output module 382, an alarm unit 383, and the like.

The display module 381 can display (output) information processed in the head unit 10 of vehicle. For example, when the head unit 10 is in a phone call mode, the display module 381 can display a User Interface (UI) or a Graphic User Interface (GUI) associated with a call or other communication. When the head unit 10 is in a navigation mode, the display module 381 can display a User Interface (UI) or a Graphic User Interface (GUI) associated with driving guide or driving route.

Particularly, in a Bluetooth pairing mode, the display module 381 can show a User Interface (UI) or a Graphic User Interface (GUI) including menus associated with the progress of a Bluetooth pairing process and/or options to control the Bluetooth pairing process.

The display module 381 can include at least one of a Liquid Crystal Display (LCD), a Thin Film Transistor-LCD (TFT-LCD), an Organic Light Emitting Diode (OLED) display, a flexible display, a three-dimensional (3D) display, or the like.

The head unit 10 of a vehicle can include two or more display modules 381 (or other display means). For example, a plurality of display modules 381 can be separately or integrally disposed on one surface of the head unit, or may be separately disposed on different surfaces.

When the display module 381 and a sensor (referred to as a 'touch sensor', hereinafter) for detecting a touch operation are overlaid in a layered manner to form a touch screen, the display module 381 can function as both an input device and an output device.

The audio output module 382 can convert and output as sound audio data received from the Bluetooth communication unit 310 or stored in the memory 360 in a call signal reception mode, a call mode, a record mode, a voice recognition mode, a Bluetooth pairing mode, and the like. Also, the audio output module 382 can provide audible outputs related to a particular function performed by the head unit 10 (e.g., a call signal reception sound, a message reception sound, etc.). The audio output module 382 can include a speaker, a buzzer, or other sound generating device. Further, the audio output module 362 can output audio data via an earphone jack located at one side of the head unit 10.

The alarm unit 383 (or other type of user notification means) can provide outputs to inform about the occurrence of an event of the head unit 10. Typical events can include call reception, message reception, key signal inputs, a touch input, etc. Herein, the vehicle status information can include a battery charging state, an ignition state, a current time slot, or the like. In addition to audio or video outputs, the alarm unit 153 can provide outputs in a different manner to inform about the occurrence of an event. Outputs informing about the occurrence of an event may be also provided via the display module 381 or the audio output module 382.

Figure 4:
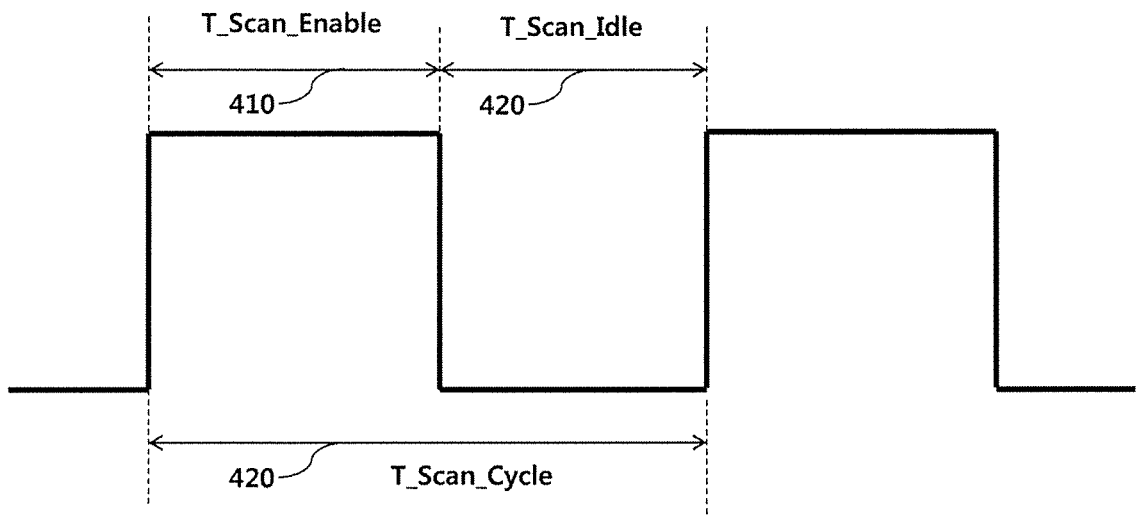
FIG. 4 shows a period of discovering an advertisement at a head unit in a vehicle.

FIG. 4 shows a period of discovering an advertisement at a head unit in a vehicle.

As shown, the period of advertisement discovery can include an active search section T_Scan_Enable 410 for discovering an advertisement and an idle section T_Scan_Idle 420 for inactivating an advertisement discovery.

The head unit 10 can control the period of advertisement discovery by adjusting at least one of the active search section T_Scan_Enable and the idle section T_Scan_Idle. A single period T_Scan_Cycle, 430 of advertisement discovery is a summation of the active search section T_Scan_Enable and the idle section T_Scan_Idle, and a search ratio Scan_Rate can be calculated by the following equation 1.

$$\text{Scan\_Rate} = T\_\text{Scan\_Enable}/T\_\text{Scan\_Cycle} \quad \text{[Equation 1]}$$

For example, if the active search section T_Scan_Enable, 410 in the period T_Scan_Cycle, 430 becomes longer and the idle section T_Scan_Idle, 420 becomes shorter, a possibility of discovering an advertisement can increase. But, as the active search section TScanEnable, 410 becomes longer and the idle section T_Scan_Idle, 420 becomes shorter, power consumption of vehicle battery can increase.

Figure 5:
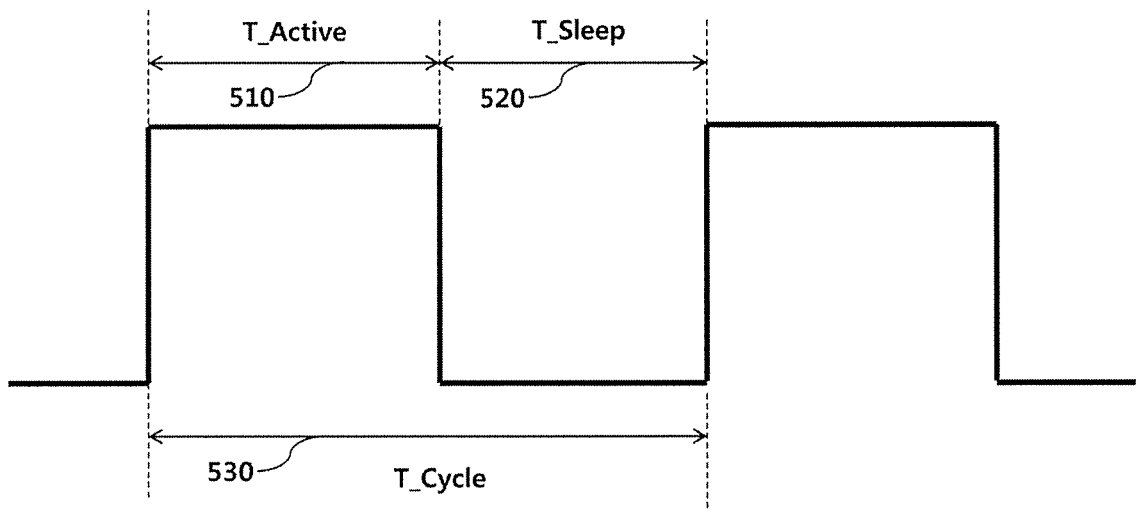
FIG. 5 describes an advertisement transmitted from a user's mobile device.

FIG. 5 describes an advertisement transmitted from a user's mobile device.

As shown, a periodic advertisement can be formed in a periodic pulse.

A period T_Cycle, 530 for advertisement broadcast can include an active transmitting section T_Active, 510 for broadcasting an advertisement and a sleep section T_Sleep, 520 for idle state.

The mobile device 20 can control at least one of the active transmitting section TActive, 510 and the sleep section T_Sleep, 520 to thereby adjust the period T_Cycle, 530. The single period T_Cycle, 530 can be a summation of the active transmitting section T_Active, 510 and the sleep section T_Sleep, 520 and a transmission rate T_Rate can be T_Rate determined by the following equation 2.

$$T\_\text{Rate} = T\_\text{Active}/T\_\text{Cycle} \quad \text{[Equation 2]}$$

For example, if the active transmitting section T_Active, 510 in the period T_Cycle, 530 becomes longer and the sleep section T_Sleep, 520 becomes shorter, there is more likelihood that an advertisement broadcasted by the mobile device 20 is discovered by the head unit 10. But, as the active transmitting section T_Active, 510 becomes longer and the sleep section T_Sleep, 520 becomes shorter, power consumption in the mobile device can increase.

A vehicle manufacturer can provide an application for an automatic Bluetooth connection, including a predetermined user interface configured to setup or determine at least one of the active transmitting section T_Active, 510 and the sleep section T_Sleep, 520 and the transmission rate T_Rate, 530.

Figure 6:
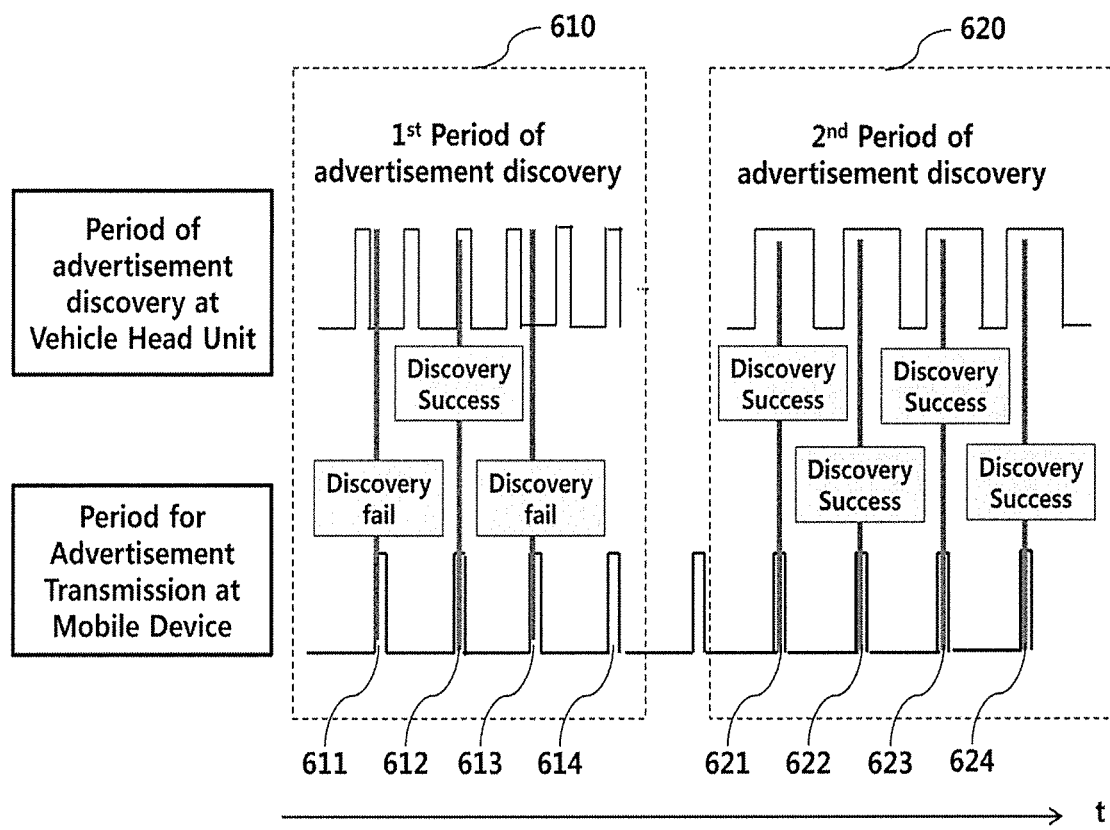
FIG. 6 describes an advertisement discovery performance based on different periods for an advertisement discovery.

FIG. 6 describes an advertisement discovery performance based on different periods for an advertisement discovery.

Referring to a first part 610, among plural advertisements 611, 612, 613, 614 broadcasted by the mobile device 20, the single advertisement 612 can be discovered by the head unit 10 of a vehicle which has a first period of advertisement discovery.

However, referring to a second part 620, all of plural advertisements 621, 622, 623, 624 broadcasted by the mobile device 20 can be discovered by the head unit 10 of a vehicle which has a second period of advertisement discovery.

Comparing between the first and second parts 610, 620, when the head unit 10 discovers an advertisement with the second period of advertisement discovery rather than the first period, the possibility of discovering an advertisement broadcasted by the mobile device 20 can increase. Likewise, a search ratio Scan_Rate of the second period of advertisement discovery is higher than that of the first period of advertisement discovery.

Figure 7:
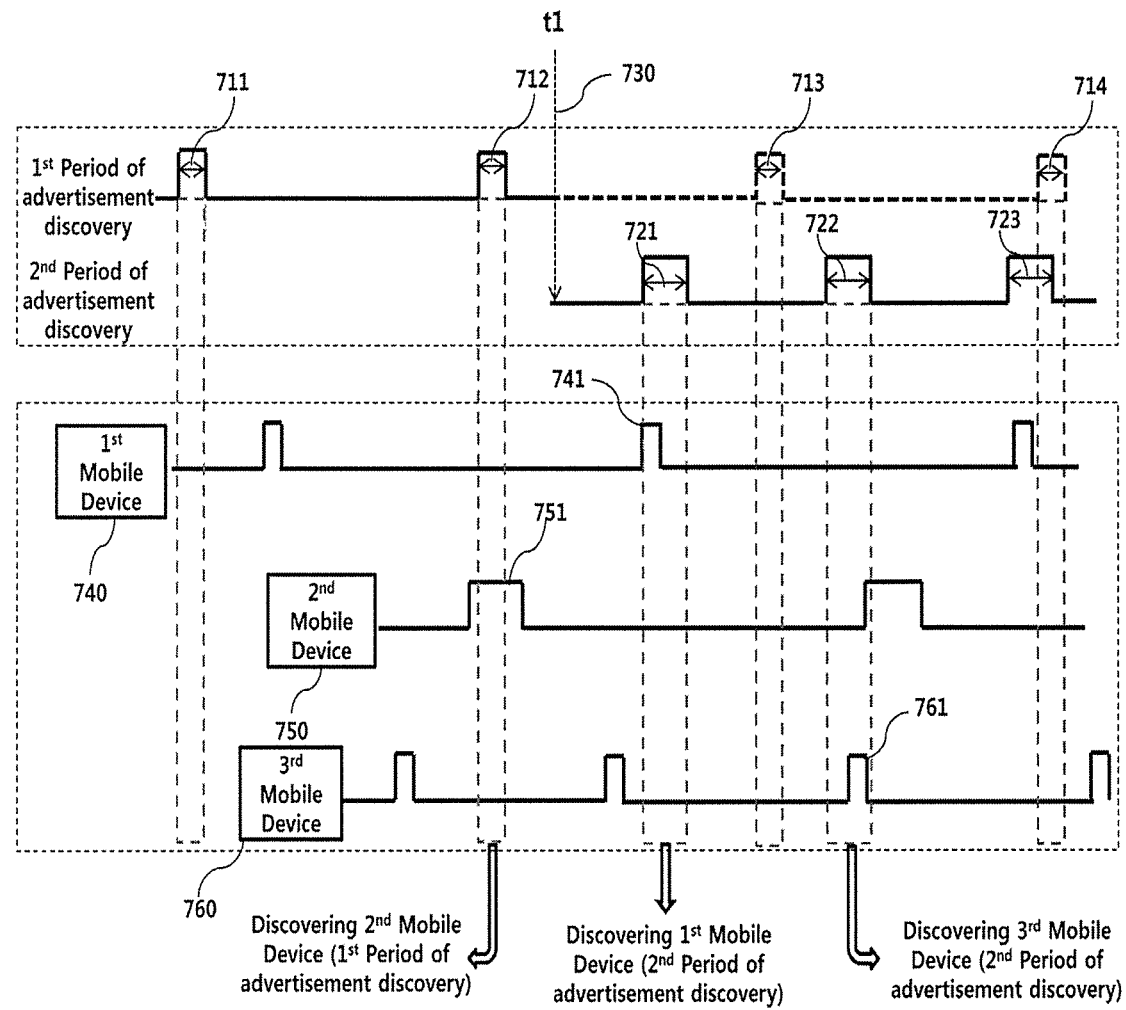
FIG. 7 illustrates an advertisement discovery performance against plural user's mobile devices based on different periods for an advertisement discovery.

FIG. 7 illustrates an advertisement discovery performance against plural user's mobile devices based on different periods for an advertisement discovery.

The head unit 10 can determine whether it is necessary to change or adjust a period of advertisement discovery based on vehicle status information. Referring to FIG. 7, a first period of advertisement discovery can be changed with a second period of advertisement discovery at a first timing t1, 730. In a case of the first period of advertisement discovery, i.e., before the first timing t1, the head unit 10 of vehicle can discover an advertisement 751 broadcasted from a second mobile device 750, and the head unit 10 can recognize the second mobile device 750.

In a case of the second period of advertisement discovery, i.e., after the first timing t1, an advertisement 741 broadcasted by a first mobile device 740 can be discovered by the head unit 10, and the head unit 10 can recognize the first mobile device 750.

Then, another advertisement 761 broadcasted by a third mobile device 760 can be discovered by the head unit 10, and the head unit 10 can recognize the third mobile device 760.

Referring to FIG. 7, if the period of advertisement discovery is not changed at the first timing t1 and the first period of advertisement discovery is kept, the first and third mobile device 740, 760 may be not be discovered by the head unit 10 during active search sections 713, 714 in the first period of advertisement discovery. When the head unit 10 first discovers a mobile device (herein, the second mobile device 750) and automatically change the period of advertisement discovery to increase at least one of a search time, the number of periods, and a search ratio during a predetermined time unit, possibility of discovering other devices (herein, the first and third mobile devices 740, 760) can be increased. Accordingly, the head unit 10 can discover another mobile device faster.

Figure 8:
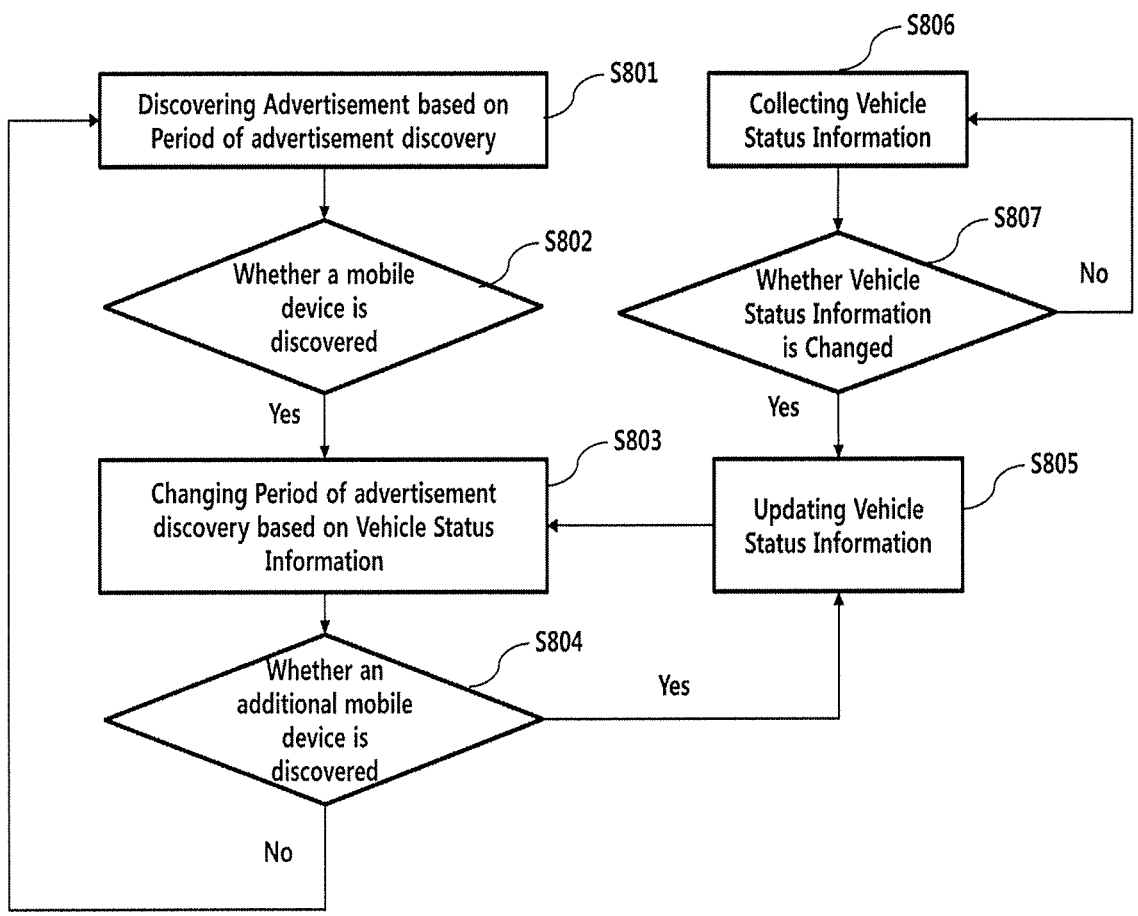
FIG. 8 describes a method for changing a period for an advertisement discovery in a head unit of vehicle.

FIG. 8 describes a method for changing a period for an advertisement discovery in a head unit of vehicle.

As shown, the head unit 10 of a vehicle starts to discover an advertisement with a first period of advertisement discovery (S801).

When a mobile device is discovered first, the head unit 10 can change the current period, e.g., the first period, of advertisement discovery based on vehicle status information (S802, S803).

When discovering another mobile device additionally with the changed period of advertisement discovery, the head unit 10 can update vehicle status information and change the period of advertisement discovery again (S804, S805). By way of example but not limitation, the vehicle status information can include how many discovered mobile devices are discovered.

If another mobile device is not discovered during a predetermined time after the mobile device is discovered first, the head unit 10 can change the period of advertisement discovery to perform a process of advertisement discovery.

Further, the head unit 10 can collect plural vehicle status information via the vehicle gateway 30 (S806). For example, the head unit 10 can receive the current date and time information from a GPS module (not shown) adapted in the vehicle.

Based on the collected vehicle status information, the head unit 10 can determine whether the stored (or previous) vehicle status information is changed (S807).

When the vehicle status information is changed, the head unit 10 can update the vehicle status information (S805), and change the period of advertisement discovery (S803). However, if the vehicle status information is not changed, the head unit 10 can collect vehicle status information again (S806).

For example, the head unit 10 can collect the current date and time information via a GPS module (not shown) adapted in the vehicle, and then change the period of advertisement discovery when the current time slot is changed.

For example, the head unit 10 can adjust the period of advertisement discovery in response to a given value inputted via a predetermined input means by a user or a driver.

Figure 9:
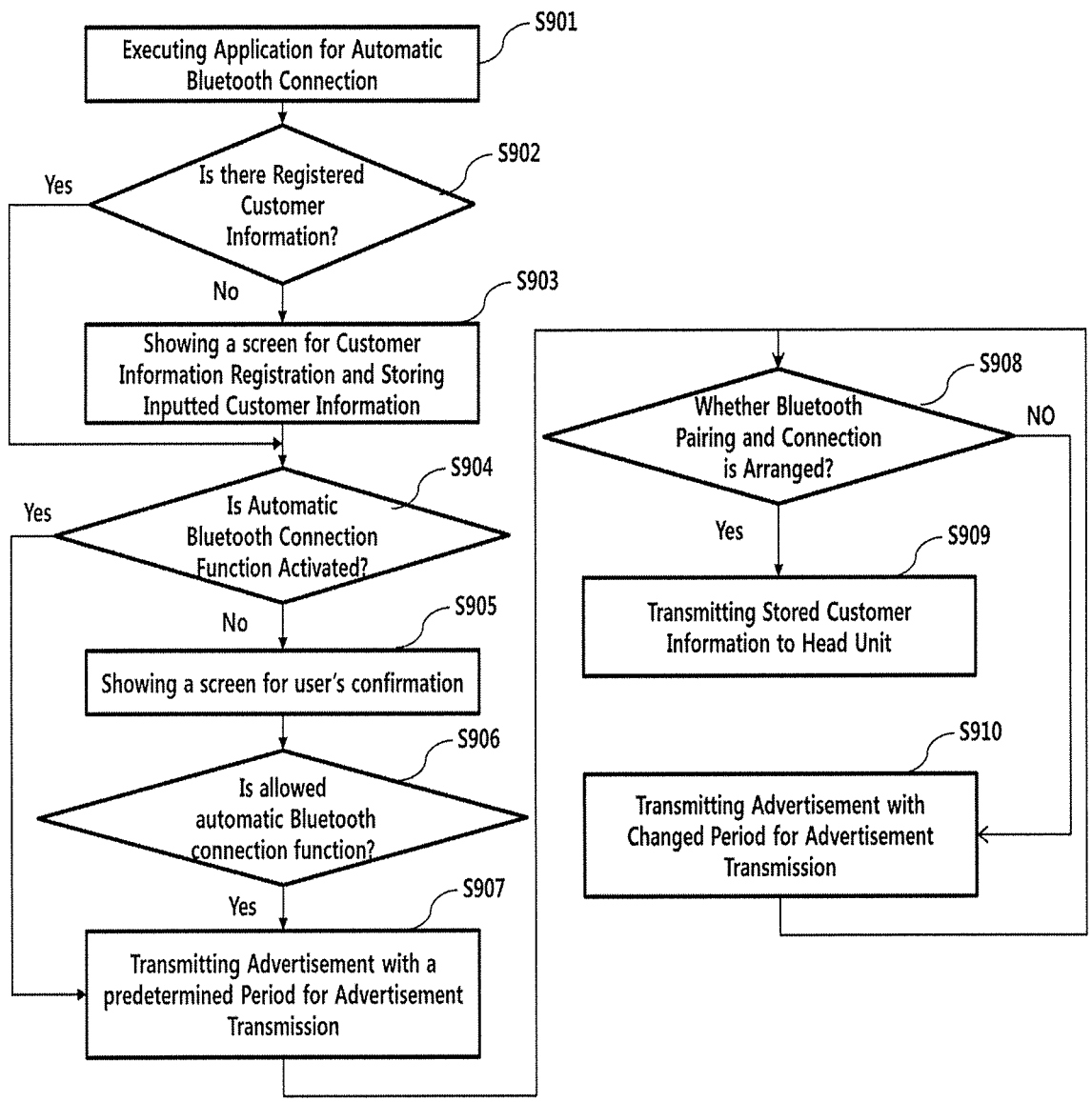
FIG. 9 describes a method for changing a period for an advertisement transmission in user's mobile device.

FIG. 9 describes a method for changing a period for an advertisement transmission in a user's mobile device.

As shown, when an application for automatic Bluetooth connection is executed according to a user's input on a menu, the mobile device 20 can check whether customer information registered in the head unit 10 of vehicle exists (S901, S902).

If there is no registered customer information, the mobile device 20 can show an interface for registering customer information on a screen and store customer information inputted by a user (S903). By way of example but not limitation, the customer information can include at least one of a telephone number, a name, and a nickname. The customer information is a kind of unique information identifying a mobile device, i.e., distinguishing a mobile device from another mobile device. The stored customer information can be transferred to the head unit 10 via a Bluetooth connection.

The mobile device 20 can check whether the function for automatic Bluetooth connection is activated (S904).

Figure 10:
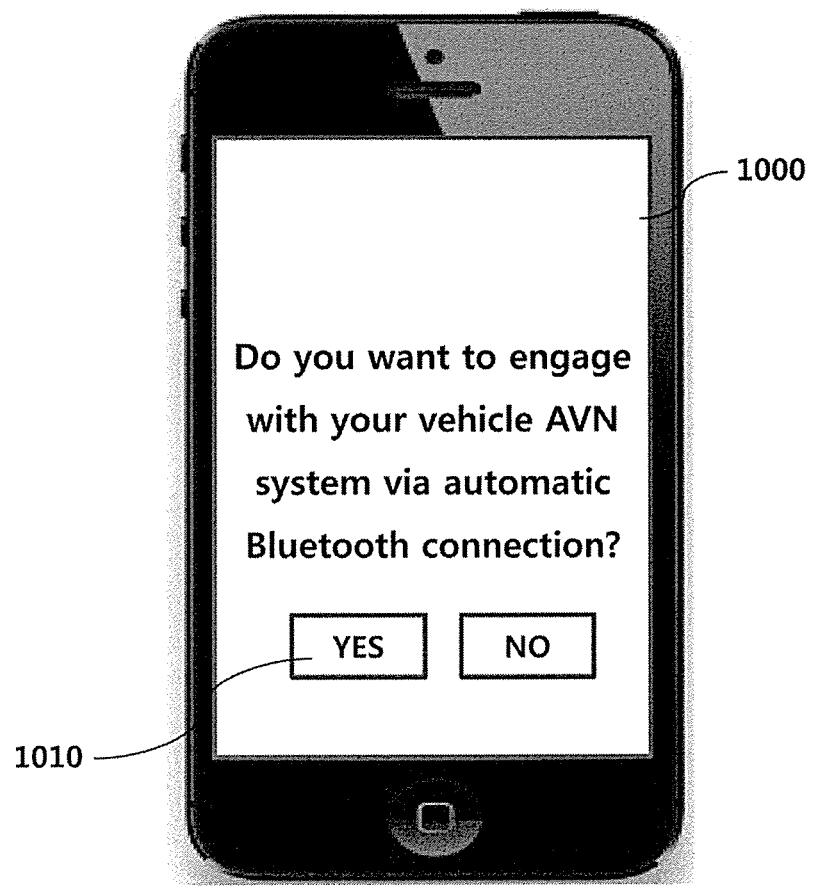
FIG. 10 shows a screen for automatic Bluetooth connection.

When the function for automatic Bluetooth connection is not activated, the mobile device 20 can show a predetermined interface with a message for asking a user's agreement to activate the function for automatic Bluetooth connection, e.g., a screen for automatic Bluetooth connection 1000 shown in FIG. 10, on a screen (S905).

If a confirmation button 1010 included in the screen for automatic Bluetooth connection 1000 is selected, the mobile device 20 can activate the function for automatic Bluetooth connection and broadcast an advertisement with a predetermined period of advertisement broadcasting (S906, S907).

If a Bluetooth pairing process and a Bluetooth connection is successfully performed within a predetermined time after the advertisement is broadcasted, the mobile device 20 can transfer the stored customer information to the head unit 10 of a vehicle (S908, S909). At this time, the mobile device 20 can additionally transmit its Bluetooth device information to the head unit 10 of a vehicle.

When a Bluetooth pairing process and a Bluetooth connection fails within a predetermined time after the advertisement is broadcasted, the mobile device 20 can change the period of advertisement broadcasting and then broadcast the advertisement with the changed period (S910). For example, the mobile device 20 can increase a transmission rate of advertisement broadcasting during a predetermined time unit so as to augment a possibility that the advertisement is discovered by the head unit 10.

In checking whether customer information is registered in the head unit 10 (S902), if there is registered customer information, the mobile device 20 can perform a step of checking whether the function for automatic Bluetooth connection is activated (S904)

Further, in checking whether the function for automatic Bluetooth connection is activated (S904), if the function is activated, the mobile device 20 can perform a step of broadcasting an advertisement with a predetermined period of advertisement broadcasting (S907).

In FIG. 9, by way of example but not limitation, when a Bluetooth connection fails within a predetermined time after an advertisement is broadcasted, the mobile device 20 can change the period of advertisement broadcasting. Further, the mobile device 20 can control, e.g., adjust or change, the period of advertisement broadcasting based on a battery charging state, an application running state, power consumption during a predetermined time unit, a charging amount of a battery during a predetermined time unit, or the like.

For example, when the charging amount of battery is beyond a predetermined reference level and the power consumption during a predetermined time unit is below a predetermined reference level, the mobile device 10 can change the period of advertisement broadcasting to thereby increase a possibility that the advertisement is discovered by the head unit 10.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for automatic Bluetooth connection in a mobile device engaging with a head unit of a vehicle, the method comprising:
- broadcasting an advertisement with a predetermined period of advertisement broadcast when a Bluetooth function is inactivated;
- receiving vehicle status information from a vehicle gateway engaged via in-vehicle networking and a request signal for activating the Bluetooth function from the head unit of the vehicle;
- changing the period of advertisement broadcasting based on current status information of the mobile device; and
- broadcasting the advertisement with the changed period for advertisement broadcast,
- wherein the current status information includes a battery charging state and a Bluetooth connection state with the head unit of the vehicle,
- wherein the mobile device includes an application provided by a vehicle manufacturer,
- wherein the application provides a predetermined menu to determine whether an automatic Bluetooth connection function is activated,
- wherein, while the automatic Bluetooth connection function is activated, the advertisement is periodically transmitted even if a function for Bluetooth connection is not activated, and
- wherein the period of advertisement broadcasting is further based on the vehicle status information after a Bluetooth pairing of the head unit is turned on.

2. The method according to claim 1, further comprising:
- checking whether the automatic Bluetooth connection function is activated.

3. The method according to claim 2, further comprising:
- activating the Bluetooth function to thereby arrange a Bluetooth connection with the head unit, when the automatic Bluetooth connection function is activated.

4. The method according to claim 3, further comprising:
- when the automatic Bluetooth connection function is not activated, showing a predetermined screen configured to receive user's confirmation which enables the automatic Bluetooth connection function to work.

5. The method according to claim 1, wherein the period of advertisement broadcasting is adjusted to increase a search time and the number of periods during a predetermined time unit.

6. The method according to claim 1, wherein the period of advertisement broadcasting is adjusted to increase a search ratio during a predetermined time unit.

7. The method according to claim 1, wherein when at least one advertisement corresponding to the mobile device is not broadcasted after the period of advertisement broadcast is changed, adjusting the period of advertisement broadcast to decrease a search time and the number of periods during a predetermined time unit.

8. The method according to claim 1, wherein when the vehicle status information is an "on" status, adjusting the period of advertisement broadcast to maximize at least one of a search time, the number of periods, and a search ratio during a predetermined time unit.

9. The method according to claim 1, further comprising stopping the advertisement broadcast when the vehicle status information includes a warning of a vehicle battery charging state.

10. The method according to claim 1, further comprising:
- obtaining information relating to a current time slot; and
- changing the period of advertisement broadcast based on the present time slot.

11. The method according to claim 1, wherein the advertisement is a signal including a periodic pulse.

12. A non-transitory computer-readable recording medium containing instructions stored thereon for execution by a processor to cause the processor to perform a method for automatic Bluetooth connection in a mobile device engaging with a head unit of a vehicle, the method comprising:
- broadcasting an advertisement with a predetermined period of advertisement broadcast when a Bluetooth function is inactivated;
- receiving vehicle status information from a vehicle gateway engaged via in-vehicle networking and a request signal for activating the Bluetooth function from the head unit of the vehicle;
- changing the period of advertisement broadcasting based on current status information of the mobile device; and
- broadcasting the advertisement with the changed period for advertisement broadcast,
- wherein the current status information includes a battery charging state and a Bluetooth connection state with the head unit of the vehicle,
- wherein the mobile device includes an application provided by a vehicle manufacturer,
- wherein the application provides a predetermined menu to determine whether an automatic Bluetooth connection function is activated,
- wherein, while the automatic Bluetooth connection function is activated, the advertisement is periodically transmitted even if a function for Bluetooth connection is not activated, and
- wherein the period of advertisement broadcasting is further based on the vehicle status information after a Bluetooth pairing of the head unit is turned on.

* * * * *